United States Patent [19]

Kramer et al.

[11] 4,005,557
[45] Feb. 1, 1977

[54] SUCTION REDUCTION INSTALLATION FOR ROOFS

[75] Inventors: Carl Kramer, Aachen; Karl Haage, Troisdorf-Spich, both of Germany

[73] Assignee: Dynamit Nobel Aktiengesellschaft, Germany

[22] Filed: Dec. 1, 1975

[21] Appl. No.: 636,451

Related U.S. Application Data

[63] Continuation of Ser. No. 459,069, April 8, 1974, abandoned.

[30] Foreign Application Priority Data

Apr. 7, 1973 Germany .................. 2317545

[52] U.S. Cl. .................. 52/173 R; 52/24; 52/25
[51] Int. Cl.² .................. E04D 13/00; E04H 9/14; E04H 9/16
[58] Field of Search .................. 52/24–26, 52/84, 173

[56] References Cited

UNITED STATES PATENTS

| | | | |
|---|---|---|---|
| 417,270 | 12/1889 | Nelson | 52/57 |
| 507,776 | 10/1893 | Berger et al. | 52/24 |
| 939,516 | 11/1909 | Laird | 52/25 |
| 2,270,537 | 1/1942 | Ludington | 52/173 |
| 2,270,538 | 1/1942 | Ludington | 52/173 X |
| 3,280,524 | 10/1966 | Hull | 52/173 |
| 3,313,069 | 4/1967 | Jackson | 52/24 |
| 3,583,113 | 6/1971 | Winski | 52/24 |
| 3,828,498 | 8/1974 | Jones | 52/24 X |
| 3,866,363 | 2/1975 | King | 52/173 X |

FOREIGN PATENTS OR APPLICATIONS 941,690  4/1956  Germany .................. 52/25

*Primary Examiner*—Alfred C. Perham
*Attorney, Agent, or Firm*—Craig & Antonelli

[57] ABSTRACT

An installation for reducing suction forces on a flat or slightly inclined roof structure including disturbing or interfering elements or baffles arranged in the zone of the roof corners. The disturbing or interfering elements or baffles may be provided with either vertically or horizontally extending bars or may include a plurality of perforations or holes disposed in a plate member. Furthermore, the disturbing element or baffle may have a bracket-like configuration or consist of a wind guiding device of a snowplow shape.

30 Claims, 28 Drawing Figures

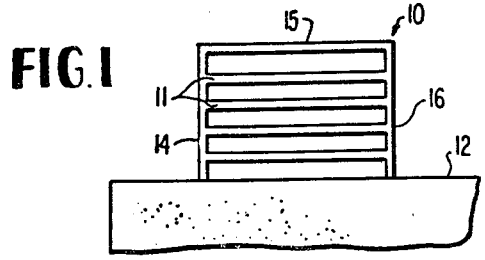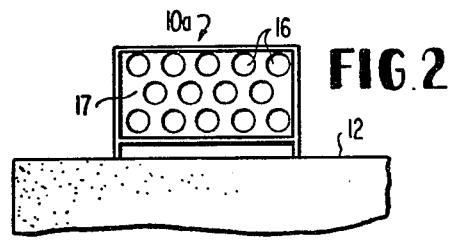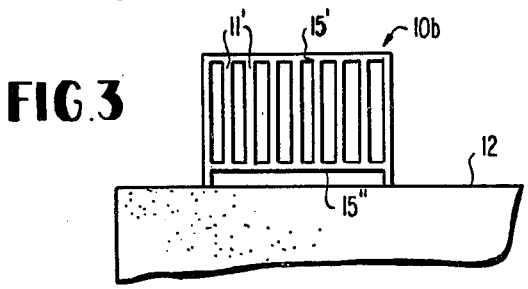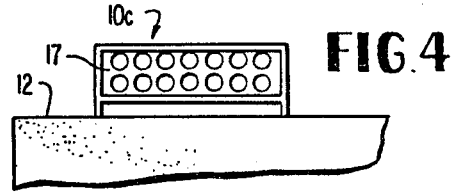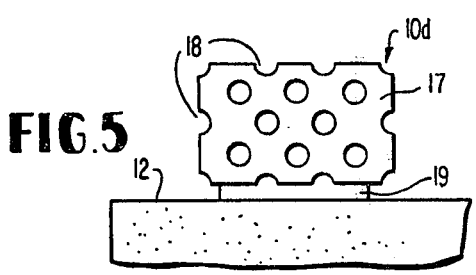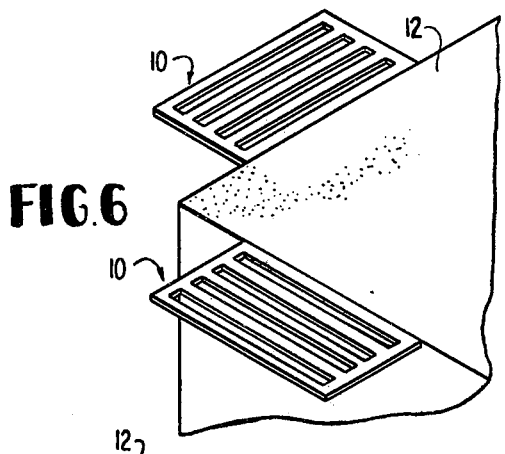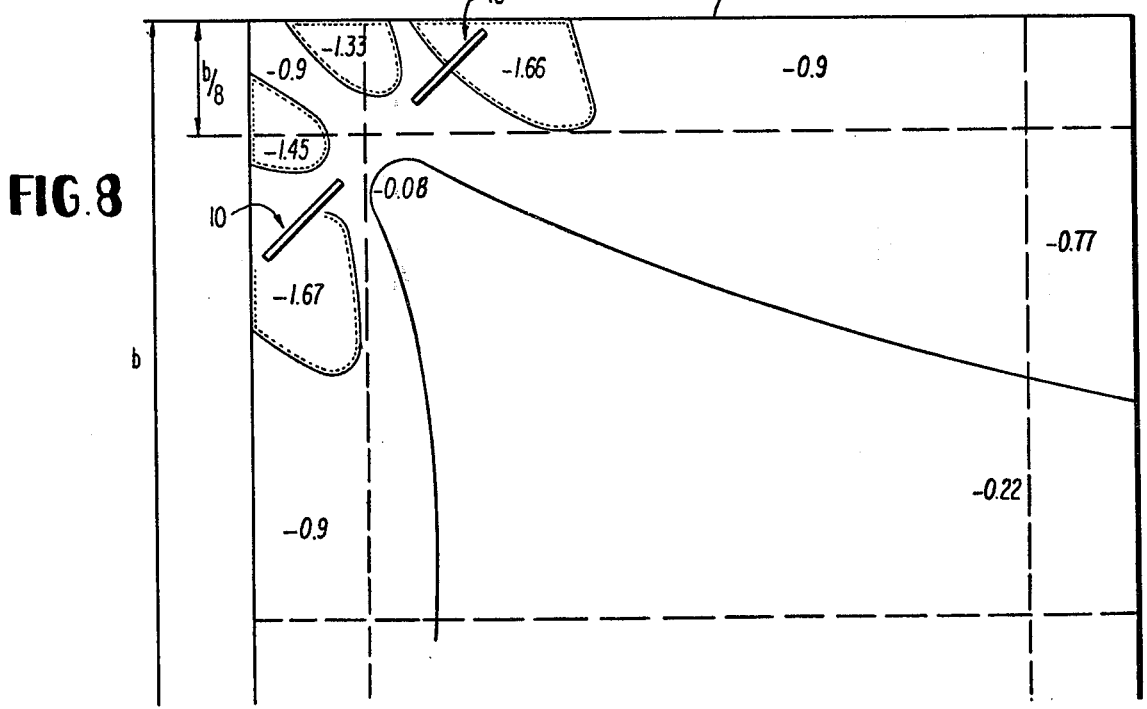

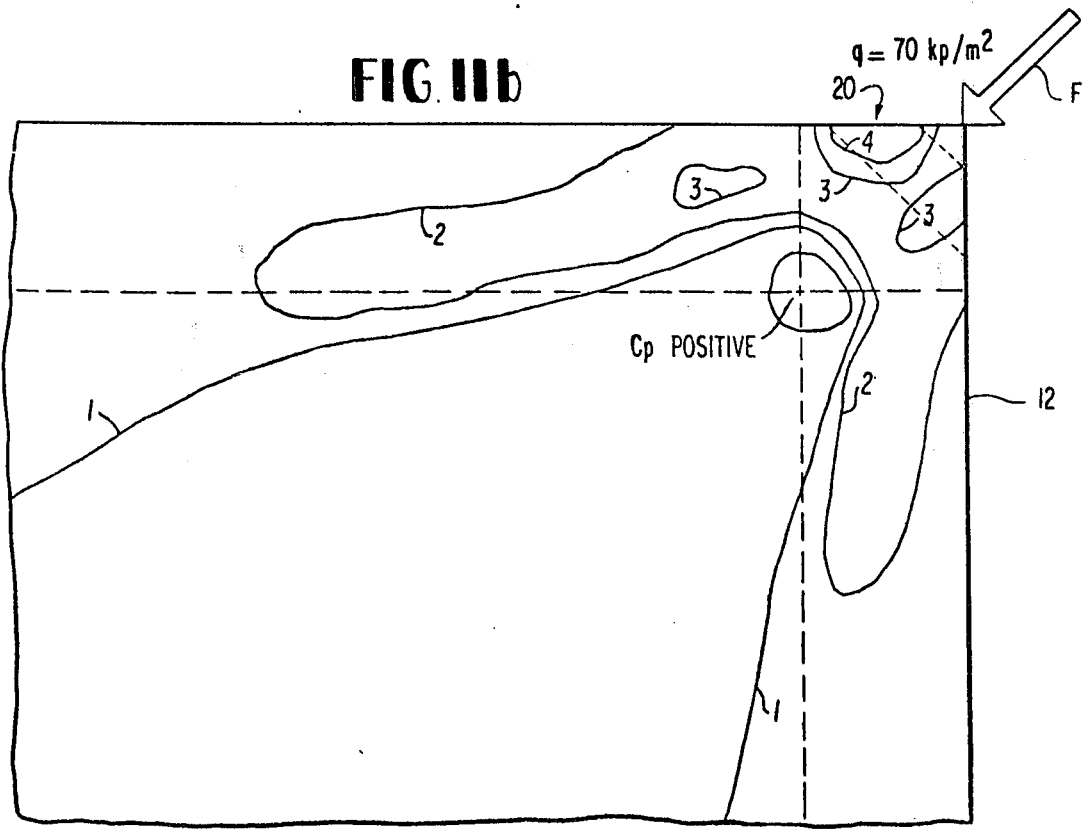
FIG. IIa
FIG. IIb

| 0.97 | 1.07 | 1.2 | 1.29 | 1.43 | 1.4 | 1.5 | 2.79 | 4.07 | 4.17 | 6.0 | 2.5 |
|------|------|-----|------|------|-----|-----|------|------|------|-----|-----|
| 1.13 | 1.17 | 1.32 | 1.46 | 1.69 | 1.89 | 2.83 | 2.82 | 3.64 | 1.92 | 1.2 | 5.5 |
| 2.22 | 1.4 | 1.51 | 1.96 | 2.43 | 2.92 | 2.86 | 0.7 | 1.39 | 1.43 | 1.26 | 3.68 |
| 1.46 | 1.67 | 1.97 | 2.22 | 2.22 | 1.65 | 0.5 | 0.33 | 0.49 | 1.43 | 3.13 | 3.5 |
| 1.43 | 1.49 | 1.29 | 0.69 | 0.36 | 0.31 | 0.36 | 0.36 | 0.31 | 0.86 | 2.6 | 2.37 |

ALL Cp-VALUES NEGATIVE (additional scattered values: 0.29, 0.79, 2.37, 2.3, 1.07; 0.21, 0.26, 0.31, 0.26, 1.76, 2.14, 1.65, 1.32; 0.5, 1.83, 1.76, 1.39, 1.2; 0.21, 0.24, 0.26, 0.93, 1.53, 1.53, 1.29, 1.5)

$q = 70 \, kp/m^2$

| | | | | | | | | | | |
|---|---|---|---|---|---|---|---|---|---|---|
| +1.07 | +1.22 | +1.22 | +1.33 | +1.49 | +1.79 | +2.57 | +3.58 | +2.22 | +2.33 +3.0 +1.72 |
| +1.14 | +1.19 | +1.29 | +1.43 | +1.72 | +2.29 | +1.79 | +1.43 | +1.86 | +2.07 +1.5 +2.38 |
| +1.14 | +1.24 | +1.33 | +1.65 | +2.0 | +1.57 | +1.36 | +1.36 | +1.43 | +1.57 +1.93 +2.72 |
| +1.17 | +1.29 | +1.5 | +1.65 | +1.5 | +1.22 | +1.22 | +1.36 | +1.29 | +1.29 +1.65 +2.38 |
| +1.29 | +1.32 | +1.22 | 0.93 | 0.88 | 0.86 | 0.71 | +1.0 | +1.14 | +1.29 +1.36 +2.38 |

ALL Cp-VALUES NEGATIVE       0.93   +1.14 +1.16 +1.22 +0.86

+0.36        +0.21        +0.19        +1.0    +1.14 +1.14 +1.14 +1.14

+1.0    +1.14 +1.07 +1.07 +1.0

0.21+       0.19+       0.21+       1.07+   1.07+ 1.0+ 0.93+ 1.65+

| | | | | | | | | | | |
|---|---|---|---|---|---|---|---|---|---|---|
| 0.87 | 0.96 | 1.0 | 1.07 | 1.15 | 1.16 | 1.16 | 1.46 | 1.5 | 1.77 | 1.76 1.33 |
| 0.9 | 0.93 | 1.0 | 1.1 | 1.17 | 1.21 | 1.28 | 1.46 | 1.46 | 1.33 | 1.47 1.83 |
| 0.9 | 0.97 | 1.03 | 1.11 | 1.19 | 1.2 | 1.34 | 1.61 | 1.49 | 1.33 | 1.4 1.9 |
| 0.91 | 0.99 | 1.06 | 1.11 | 1.19 | 1.23 | 1.31 | 1.49 | 1.17 | 1.11 | 1.4 1.9 |
| 0.97 | 0.97 | 1.01 | 1.06 | 1.1 | 1.24 | 1.41 | 1.23 | 1.17 | 1.26 | 1.21 1.17 |
| | | | | | | | 1.23 | 1.2 | 1.21 | 1.28 0.87 |
| | 0.74 | | 0.57 | | 0.25 | | 1.17 | 1.1 | 1.0 | 1.03 1.03 |
| | | | | | | | 1.1 | 1.08 | 0.89 | 1.0 0.97 |
| | 0.17 | | 0.14 | | 0.57 | | 1.03 | 1.0 | 0.87 | 0.91 1.28 |

ALL Cp-VALUES NEGATIVE $q = 70 \text{ kp/m}^2$

SUCTION REDUCTION INSTALLATION FOR ROOFS

This is a continuation of application Ser. No. 459,069 filed Apr. 8, 1974 now abandoned.

The present invention relates to a device for reducing or preventing wind suction forces on roofs which have no gradient or are slightly inclined, especially, for flat roofs.

In the construction of flat roofs or roofs with a slight inclination, as noted in DIN (German Industrial Standard) 1055, it is necessary to take the wind load into account in designing a roof structure since considerable suction forces must be expected especially in the marginal or edge zone of the roof due to turbulence formations or eddies.

Since wind suction forces reach a considerable strength, especially in cases of flat roofs or roofs with only a slight inclination, for example, an inclination of less than 30°, the problems attendant with the suction forces have customarily been solved by special constructional measures to absorb the forces effective on the roof skin. Such constructional measures have included special anchoring elements for the roof skin, and/or gluing of the roof skin, or by providing weighting means on the roof structure.

The use of special constructional measures to combat wind suction forces results in constructional difficulties as well as a considerably more expensive roof structure.

The present invention is therefore concerned with the task of providing measures by means of which a reduction of suction forces can be realized on a roof having no gradient or a slight gradient.

The underlying problems are solved according to the present invention by providing an installation to be secured at the roof structure to reduce the suction forces thereon.

According to one feature of the present invention, structural elements are provided at suitable places at the roof structure which extend beyond the normal limitations of the roof to disturb the flow conditions of the wind whereby eddy formations are prevented or greatly weakened in their effectiveness.

According to the present invention, disturbing or interferring elements or baffles are arranged in the zone of the roof corners. Depending upon local wind conditions, the disturbing elements can be disposed in the zone of one or more corners of the roof.

Additionally, it is also possible, according to the present invention, to arrange in the region of one roof corner, one, two or more individual disturbing elements.

The disturbing elements according to the present invention may be fashioned as a screen-like baffle or suitable wind-conducting elements which can be of varying configuration and character to exert a displacing effect on the wind flow across the roof surface.

According to another feature of the present invention, the baffle elements are formed with passages or openings for the wind flow of such configuration that the passing air incurs a directional change. Advantageously, the ratio of open surface to closed surface of the baffle elements for preventing or reducing wind suction forces across the roof surface should not exceed 50% of the overall surface area of the element.

According to a further feature of the present invention, the disturbing elements can be constructed so that they not only exert, in the manner of a screen, a displacing effect on the wind current, but also impart to the air passing through the disturbing element such a change in the direction of the wind current that the effectiveness of the disturbing elements is still further enhanced.

While the optimal arrangement of the disturbing elements on the roof structure depends on the ambient constructional conditions, according to one embodiment of the present invention, baffle screens are employed as the disturbing elements and are arranged in the region of the roof corner with a vertically extending screen being oriented at right angles to the bisector of the corner angle of the building.

In a further embodiment of the present invention, baffle screens are employed with the baffle surfaces thereof disposed parallel to the roof plane in front of the roof edge particularly in proximity to the roof corners. By this arrangement baffle screens can also be used, inter alia, concomitantly as sun screens, a roof cornice, attic or similar structure.

According to a further embodiment of the present invention, the roof surface may be entirely or partially surrounded with an attic which in contrast to the usual construction thereof, has a corresponding permeability at suitable locations through which part of the wind flow can pass whereby the desired disturbance of wind turbulence is effected.

In yet another embodiment of the present invention, wind conductor means which partially deflect the wind flow in the edge zone and, particularly, in the corner zone of the roof may be employed. By this arrangement, the wind stream produced by the conducting means, which has a definite direction, affects, while acting as a jet or flow spoiler, the wind current travelling over the roof. Consequently, the turbulence formations or eddies are affected in a manner similar to the fixed baffle screen arrangements of the present invention.

According to the present invention, a suitable material for the disturbing elements can be, in case of flexuarbly stiff constructions, metal sheets, wood or synthetic resins. Other suitable materials may be employed with the weathering stability of the materials being an important factor to be considered.

Additionally, the installation of the present invention may be attached to the building structure and/or the roof base by any suitable fastening means, for example, metallic bolts or the like. Furthermore, the connection with the roof surface must be watertight just as in the case of other passages therethrough.

Accordingly, it is an object of the present invention to provide an installation for the reduction of suction forces on a roof structure which avoids the difficulties and problems encountered in the prior art.

A further object of the present invention resides in providing an installation which interferes with the flow of wind at suitable places on the roof structure so that the wind caused suction forces cannot initially occur or are substantially reduced.

A further object of the present invention resides in providing an installation which renders superflous the expensive constructions for attaching the roof skin to flat roofs.

Another object of the present invention resides in providing an installation which may be easily and economically manufactured.

These and other objects, features and advantages of the present invention will become more apparent when taken in connection with the accompanying drawings which show, for the purposes of illustration only, several embodiments of the present invention, and wherein:

FIGS. 1-5 are plan views of alternate baffle or screen elements according to the present invention arranged vertically with respect to a roof surface;

FIG. 6 is a plan view of a baffle or screen element according to the present invention arranged in the plane of a roof surface;

FIG. 8 depicts an isobaric diagram of the flat-roof corner according to FIGS. 7a-7b with baffle or screen elements according to FIG. 1 erected at that point;

Figure 13A:
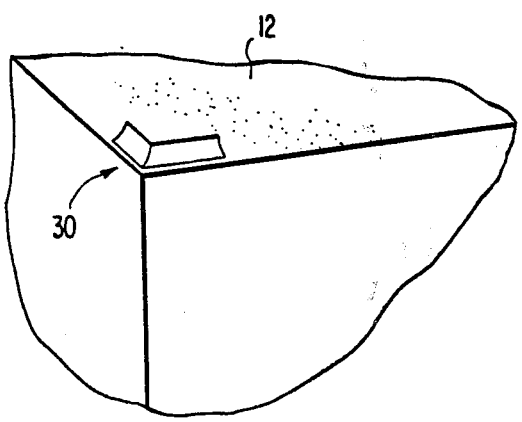
Figure 13B:
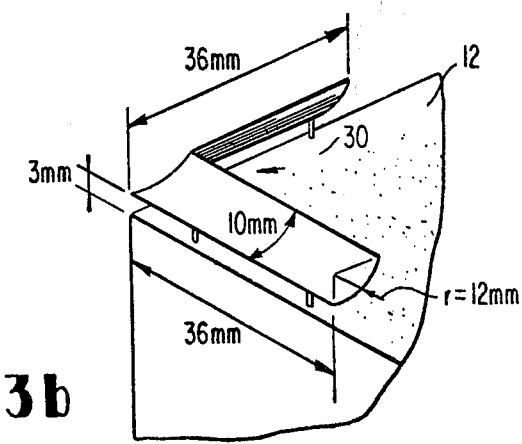
Figures 12A, 12B:
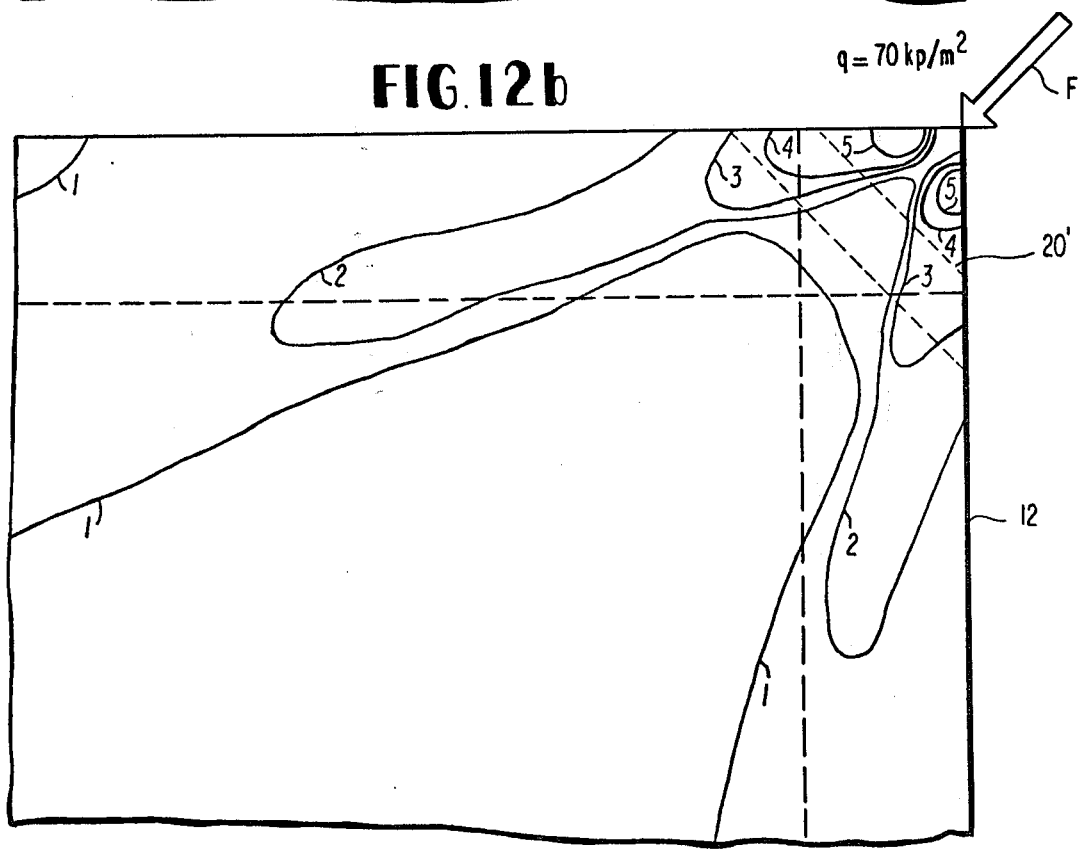
Figures 14A, 14B:
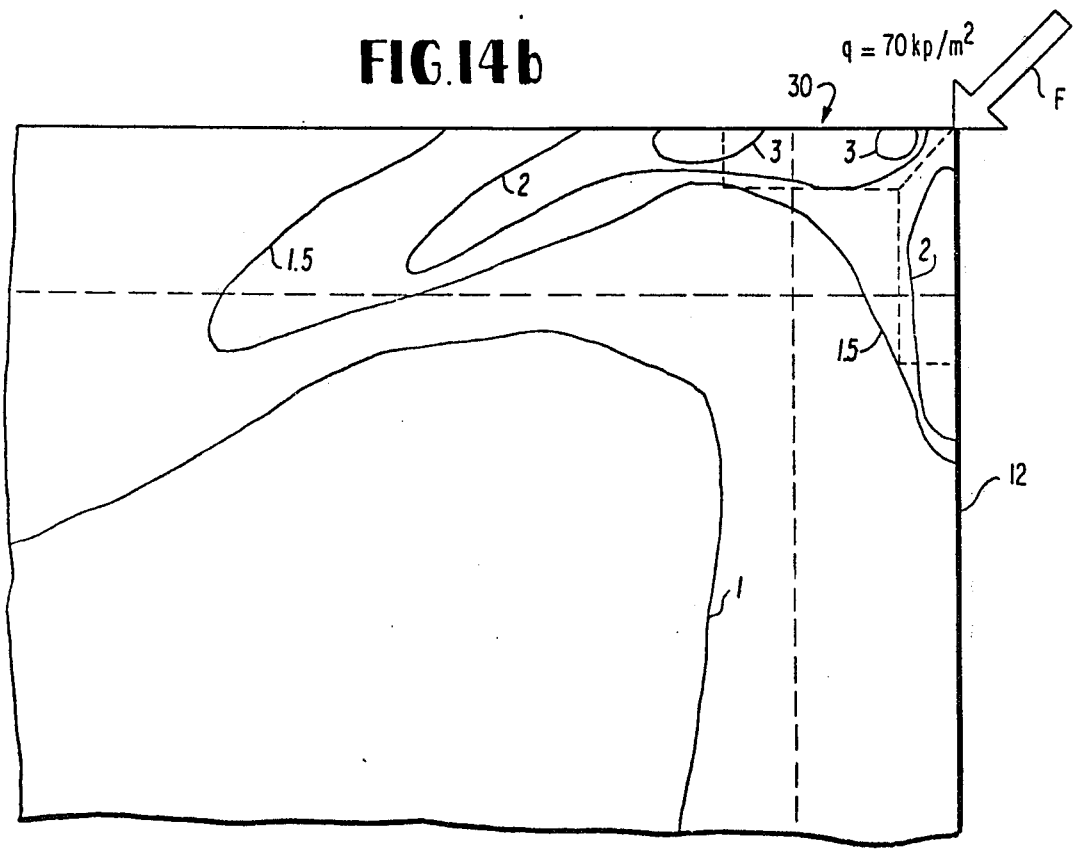
Figure 15:
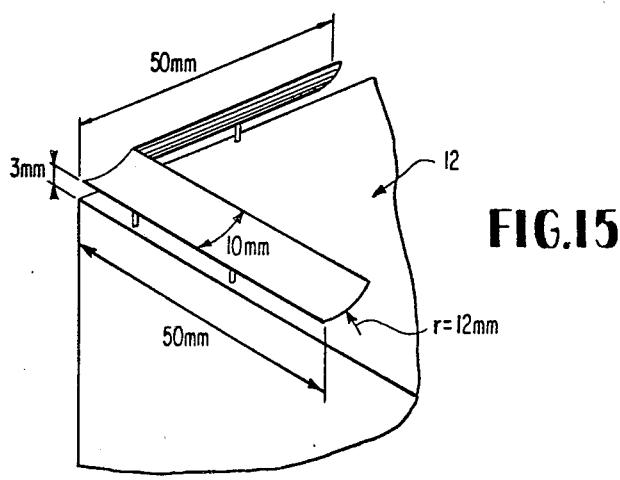
Figure 16:
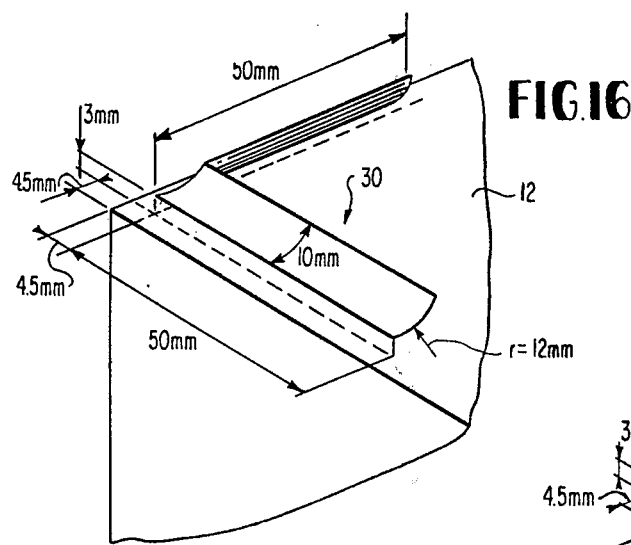
Figure 18:
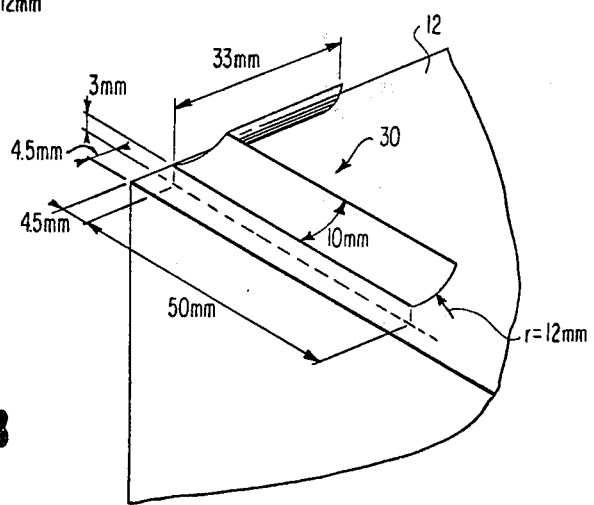
Figures 17A, 17B:
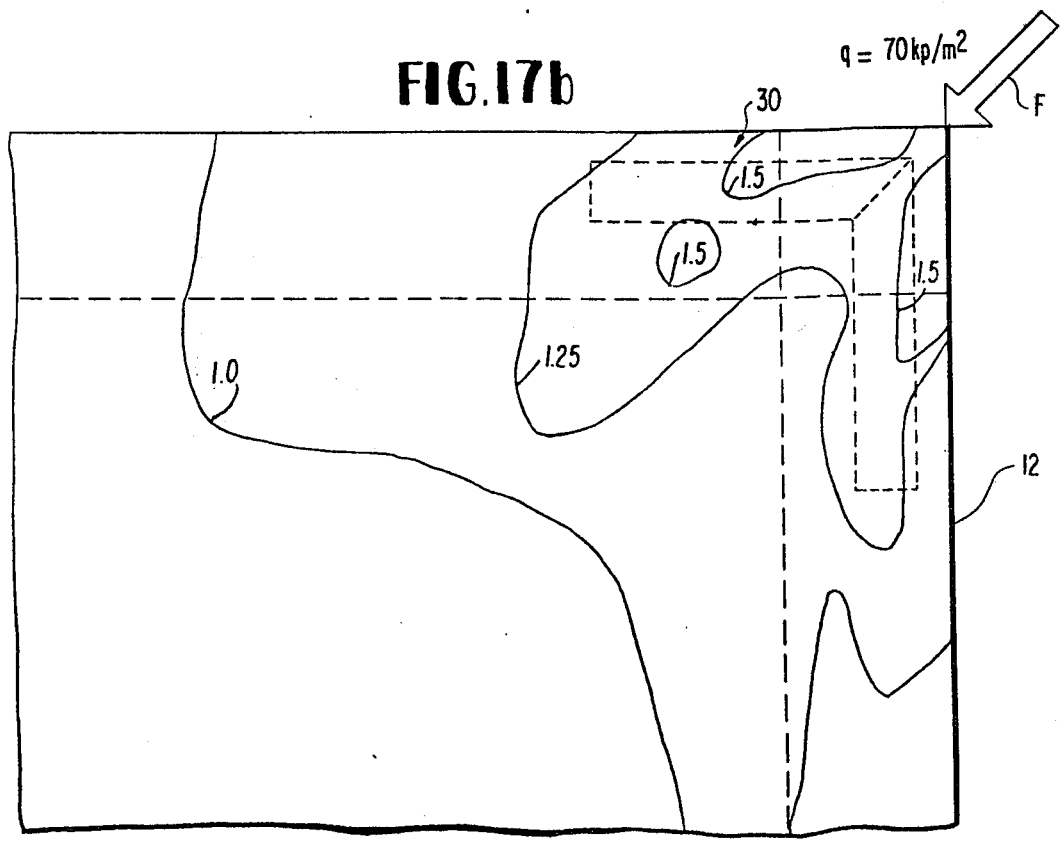

FIGS. 11a, 11b, and 12a, 12b depict measured values and isobaric diagrams in connection with the baffle elements of FIGS. 9 and 10;

FIGS. 3a and 13b are perspective views of a wind guiding or conducting element according to the present invention which is of snowplow shape;

FIGS. 14a and 14b depict measured values and an isobaric diagram in connection with the arrangement of FIG. 13;

FIGS. 15, 16 and 18 are perspective views of alternate embodiments of the wind guiding elements of FIG. 13; and FIGS. 17a and 17b depict measured values and an isobaric diagram in connection with the arrangement of FIG. 16.

Referring now to the drawings wherein like reference numerals are used throughout the various views to designate like parts and, more particularly, to FIGS. 1-5 thereof wherein vertically extending substantially rectangular baffle screens generally designated by the reference numeral 10-10d are erected on a roof surface 12 and mounted thereto by suitable fastening means (not shown). Depending upon wind and roof constructional data, the baffle screens can be arranged on a flat roof or slightly inclined roof at right angles to the roof surface 12; however, it is also possible to arrange the screens so that they are inclined to the roof surface 12.

As shown in FIG. 1, the baffle screen 10 is substantially rectangular and consists of a pair of spaced frame members 14, 15, 16 with a plurality of horizontally extending bars 11 disposed between the side frame members 14, 16. As evident from FIG. 1 the bars 11 and passages formed therebetween exert a displacing effect on the wind flow across the roof surface 12. The optimum value of the ratio of open surface to closed surface for preventing or reducing wind suction forces should not exceed 50%.

In the embodiment of FIG. 3, the baffle screen 10b is of a substantially rectangular configuration and includes bars 11' extending vertically between a pair of spaced horizontally extending frame members 15', 15''.

In further embodiments shown in FIGS. 2 and 4, the baffle screen 10a, 10c consist of a plate member 17 disposed in a frame with perforations or holes 16 disposed therein for exerting a displacing effect on the wind flow across the roof surface 12. The perforations or holes 16 may be arranged in staggered rows (FIG. 2) or in aligned rows (FIG. 4) and as with the embodiments of FIGS. 1 and 3 the optimum ratio of open surface to closed surface should not exceed 50% of the surface of the plate member 17.

In the embodiment of FIG. 5, a mounting means 19 is provided upon which is arranged the plate member 17 having holes or perforations 16 provided therein. The edge portions of the plate member 17 are of an irregular configuration and may, for example, be provided with a plurality of semi-circular cutouts or notches 18; however, for maximum effectiveness the ratio of open surface to closed surface should equal that of the embodiments of FIGS. 1-4. While the plate member 7 in FIG. 5 shows the perforations or holes 16 in a staggered relationship, it is understood that these holes may be aligned as, for example, shown in the embodiment of FIG. 4.

While FIGS. 1-5 illustrate a single baffle plate 10 disposed on a roof surface 12, it is understood that depending upon local wind conditions, two or more baffle screens 10 may be disposed in alignment or offset with respect to one another in a series arrangement.

Furthermore, as shown in FIG. 6, the baffle screen 10 of the present invention may be disposed in the plane of the roof surface 12, and extend from the roof edge in the zone of the corner thereof in the plane of the roof surface 12. By this arrangement, the baffle screen 10 can optionally fulfill other functions at the same time, for example, the baffle screen may serve to screen out the rays of the sun. While FIG. 6 illustrates the baffle screen in accordance with the embodiment of FIG. 1, it is understood that the baffle screens 10a-10d may also be disposed in the plane of the roof surface 12.

To illustrate the effectiveness of the present invention, applicants conducted a series of experiments with a roof structure having a length $l$ of 300mm and a width $b$ of 200mm. A dynamic wind pressure $q$, equal to the pressure of a 70mm column of water, was directed at the corner of the roof structure in the flow direction F pointing into the direction of the bisector of the angle of the roof. The pressure coefficients $C_p$ which equal $\Delta p/q$ were measured at predetermined intervals on the smooth flat roof structure without any installation for reducing suction forces and the flat roof surface provided with baffle screen elements according to the present invention with the results of such experimentation being shown in FIGS. 7 and 8.

Figure 7A:
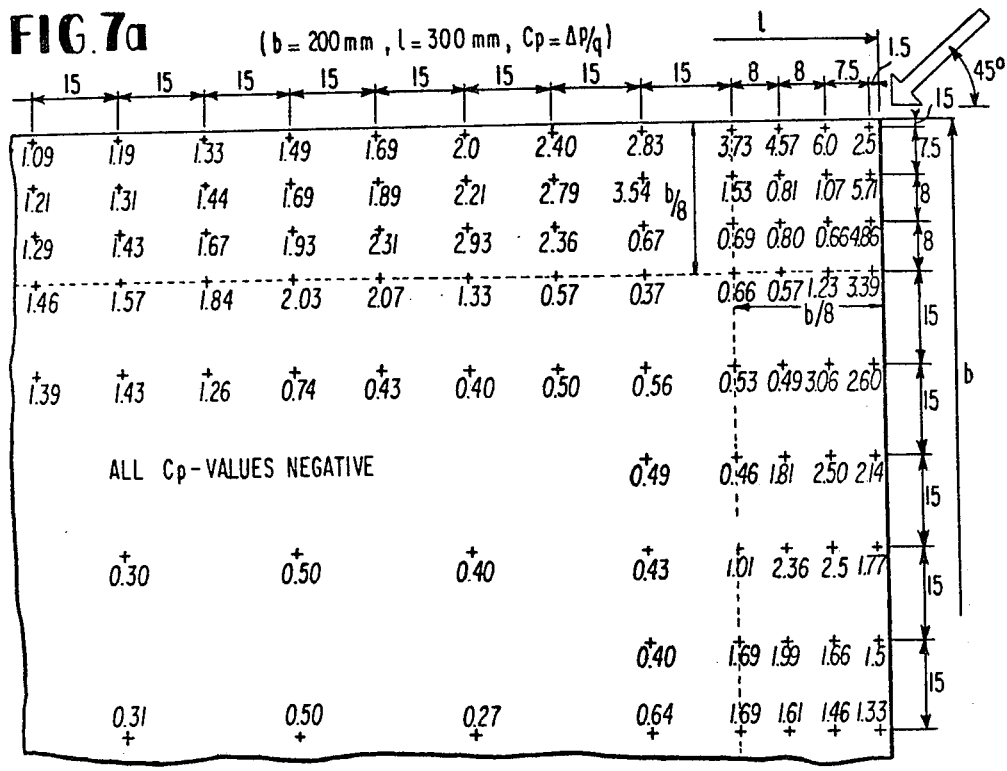
FIG. 7a-7b depict measured values and an isobaric diagram of a flat roof corner without baffle or screen elements.
Figure 7B:
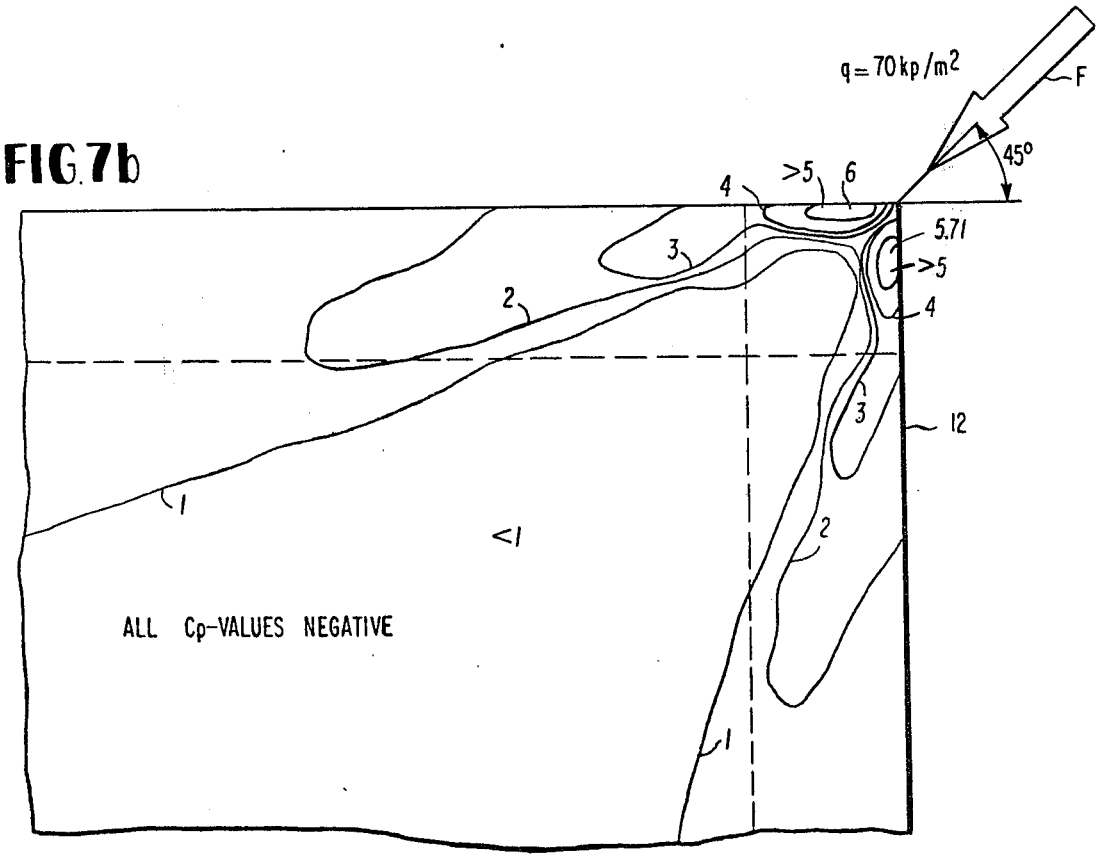

FIG. 7a illustrates pressure coefficients $C_p$ on the roof structure without the baffle elements of the present invention and FIG. 7b illustrates, on the same scale, the isobars on the roof surface 12 without the installation of the present invention. It has been determined that, with a flow direction F, the highest vacuum occurs on the roof surface and, more particularly, in the edge zones immediately in the corner region of the roof surface and along the respective edges thereof.

As shown in FIG. 8, two baffle screens 10 are erected in the zone of the corner at right angles to the diagonal of the roof 12 and extend vertically therefrom. The values in the isobaric diagram of the roof 12 or pressure coefficients $C_p$ at the respective locations are reflected by the equation:

$$C_p = \Delta p/q,$$

where:
p = local pressure difference, and
$q = \frac{1}{2} \rho v^2$
where:
$\rho$ = air density
$v$ = reference velocity.

As shown in FIG. 8, experimentally, a particularly favorable arrangement of the baffle screens 10 is attained in the zone of the roof corner when the direction of the vertical screen surface is disposed at an angle to the bisector of the angle of the building corner with spacing from the roof corner being on the order of magnitude of about $2m > b/4 < 4$ m, where $b$ = width of the roof.

As evident from comparing the data in FIGS. 7a, 7b, with that of FIG. 8, without the baffle screens 10 of the present invention, suction forces are produced which amount to more than three times the dynamic wind pressure. However, by arranging the baffle screens 10 as shown in FIG. 8, the suction forces can be reduced by about 50%.

Figure 9A:
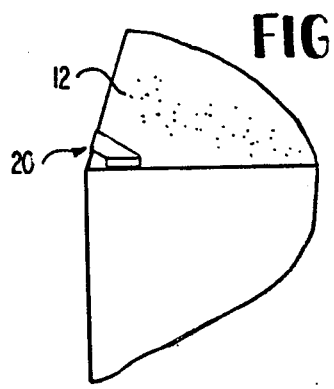
FIGS. 9a, 9b, 9c are perspective, side and top plan views, respectively, of a further embodiment of the present invention constructed as a wind guiding or conducting element in bracket shape.
Figure 9B:
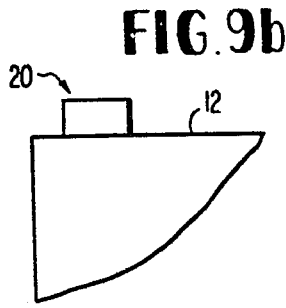
Figure 9C:
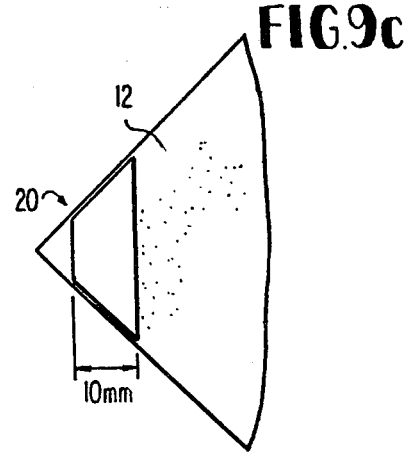

FIGS. 9a–9c illustrate a further embodiment of the present invention wherein a wind guiding device generally designated by the reference numeral 20 is constructed as a substantially U-shaped bracket, and disposed on the roof surface 12 in the edge of the corner zone of the building with the legs of the bracket extending substantially parallel to the respective edges of the roof surface 12.

Figure 10A:
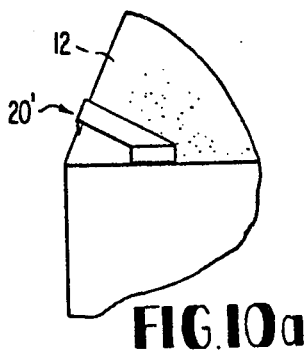
FIGS. 10a, 10b, 10c, are perspective, side, and top plan views, respectively, of a further embodiment of the present invention constructed as a bracket-shaped wind guiding or conducting element.
Figure 10B:
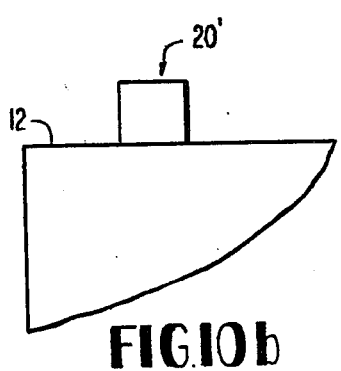
Figure 10C:
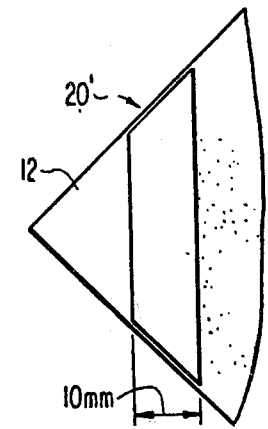

In FIGS. 10a–10c, a somewhat larger wind guiding device 20' constructed as a U-shaped bracket is disposed on the roof surface 12 and spaced at a greater distance from the corner thereof than the arrangement illustrated in FIGS. 9a–9c.

A comparison of FIGS. 7a, 7b with FIGS. 11a, 11b, 12a, and 12b, which latter figures represent pressure coefficients $C_p$ and isobaric diagrams for the U-shaped bracket arrangements of FIGS. 9a–9c and FIGS. 10a–10c, respectively, reveals that, although pressure peaks above $C_p = -3$ disappear, except for small zones in the edge region, the distribution of pressure otherwise is not subjected to essential changes. However, as evident from these figures, in the central area of the roof surface 12, the vacuum values are even smaller than exist in a flat roof without the present invention. Additionally, experimentally, the smaller U-shaped bracket arrangement attached directly to the roof edge as shown in FIG. 9 has proven to be somewhat more effective than the larger bracket arrangement of FIG. 10.

FIG. 13a illustrates a further embodiment of the present invention wherein a wind conducting or guiding element generally designated by the reference numeral 30 is disposed at the corner of the building spaced from the roof surface 12. As indicated in FIG. 13a, the guiding element 30 is constructed snowplow in shape to impart to the wind flow a direction of rotation in opposition to the direction of rotation of the wind turbulence thereby reducing the eddy intensity. Advantageously, the guiding element 30 can be produced of synthetic resin pipe sections.

FIGS. 14a, 14b illustrate pressure coefficient $C_p$ and isobaric diagrams of the guiding element 30 constructed as shown in FIG. 13. As shown in FIGS. 14a, 14b, high vacuum pressures, which could become dangerous to the roof skin, merely occur directly at the roof edge. However, the edge of the roof is conventionally covered by an edge molding, consequently, the roof surface 12 would not be endangered by these high vacuum pressures.

A comparison of the values of the pressure coefficients $C_p$ of FIGS. 14a, 14b with those of FIGS. 7a, 7b, reveals a considerable reduction in the suction forces on the roof surface 12 and, in all cases, a reduction of more than 50%.

A comparison of FIG. 7b with FIG. 14b reveals that the effect of the guide element 30 is larger at the short roof edge $b$ (FIG. 7a) than the long roof edge $l$ (FIG. 7a); therefore, according to the present invention, it is possible to extend the guide element 30 as indicated in FIG. 15 thereby further improving its effectiveness.

Additionally, it is advantageous if the guide element 30 is disposed somewhat behind the roof edge as indicated in FIG. 16. This later arrangement is favorable because of roof drainage, for example, water dripping off the guide element 30. By disposing the guide element 30 at a distance from the roof edge, there is no danger of the formation of dirty streaks on the sides of the building due to soiled water since the water drips directly onto the roof surface 12.

Furthermore, as can be seen from measured values according to FIGS. 17a, 17b in relation to the arrangement of FIG. 16, no negative $C_p$ values are produced along the entire roof surface which are larger than $a$ -1.5 except for the edge zones immediately in the corner region. Consequently, as compared to the smooth flat roof structures of FIGS. 7a, 7b, the vacuum values by the arrangement of FIG. 16 are reduced in the endangered zones by more than one-half.

Furthermore, it has been found that the overall effect of the wind guiding device of the present invention can be extensively enhanced if the length of the leg of the guiding device 30 disposed in parallel to the short roof edge $b$ (FIG. 7a) is correspondingly shortened as for example shown in the arrangement of FIG. 18.

While we have shown and described several embodiments in accordance with the present invention, it is understood that the same is not limited thereto but is susceptible to numerous changes and modifications as known to a person skilled in the art, and we therefore do not wish to be limited to the details shown and described herein but intend to cover all such changes and modifications as are encompassed by the scope of the appended claims.

What is claimed is:

1. An arrangement for reducing wind suction forces on a roof the surface of which has no gradient, the roof surface in a horizontal projection being polygonal in shape with sides thereof intersecting and forming roof corners, the arrangement comprising: at least two wind disturbing means for disturbing the flow condition of the wind along the surface of the roof and for reducing eddy formations thereon, said at least two wind disturbing means being provided only in the zone of at least one of the roof corners at a right angle to a bisector of the angle of the at least one roof corner, and means for mounting said wind disturbing means to project beyond the normal limitation of the roof.

2. An arrangement according to claim 1, wherein each of said wind disturbing means is constructed screen-like for exerting a displacing effect on the wind flow.

3. An arrangement according to claim 1, wherein each of said wind disturbing means includes a plate means, said plate means being provided with a plurality of passage means for imparting a directional change in the wind flow.

4. An arrangement according to claim 3, wherein said passage means are disposed in said plate means in a plurality of rows, and wherein said rows are staggered with respect to each other.

5. An arrangement according to claim 4, wherein said plate means projects vertically from the roof surface.

6. An arrangement according to claim 5, wherein said plate means includes spaced edge portions, and wherein said edge portions are provided with a plurality of spaced cutout portions for imparting a directional change to the wind flow.

7. An arrangement according to claim 3, wherein the ratio of open surface to closed surface of said screen-like disturbing means is less than 50%.

8. An arrangement according to claim 3, wherein said passage means are disposed in said plate means in a plurality of aligned rows.

9. An arrangement according to claim 8, wherein said plate means projects vertically from said roof surface.

10. An arrangement according to claim 9, wherein said plate means includes spaced edge portions, and wherein said edge portions are provided with a plurality of spaced cutout portions for imparting a directional change to the wind flow.

11. An arrangement according to claim 1, wherein said wind disturbing means projects vertically from the roof surface.

12. An arrangement according to claim 11, wherein each of said wind disturbing means includes at least a pair of spaced vertically extending frame members, and a plurality of horizontally disposed bar members extending between said frame members.

13. An arrangement according to claim 11, wherein each of said wind disturbing means includes at least a pair of spaced horizontally extending frame members, and a plurality of vertically extending bar members disposed between said frame members.

14. An arrangement according to claim 1, wherein said wind disturbing means includes a bracket means disposed on the roof surface in the zone of at least one of the roof corners.

15. An arrangement according to claim 14, wherein said bracket means is substantially U-shaped with the leg portions thereof opening towards said roof surface.

16. An arrangement according to claim 15, wherein said leg portions are disposed substantially parallel to a respective side of said roof surface.

17. An arrangement according to claim 16, wherein said bracket is mounted a predetermined distance from said at least one roof corner.

18. An arrangement for reducing suction forces on a roof, the surface of which has no gradient, the roof surface in a horizontal projection being polygonal in shape with the sides thereof intersecting and forming roof corners, the arrangement comprising: at least two wind disturbing means for disturbing the flow condition of the wind along the surface of the roof and for reducing eddy formations thereon, said at least two wind disturbing means being disposed only in the zone of at least one of the roof corners and projecting from the roof surface substantially in a plane parallel thereto, means for mounting said at least two wind disturbing means at said at least one roof corner to project beyond the normal limitation of the roof, said wind disturbing means being respectively mounted along sides of the roof surface forming said at least one roof corner.

19. An arrangement according to claim 18, wherein each of said disturbing means includes a plate means, each of said plate means being provided with a plurality of passage means for imparting a directional change to the wind flow.

20. An arrangement according to claim 19, wherein said passage means in each of said plate means are disposed in a plurality of rows, each of said rows in each of said plate means being staggered with respect to each other.

21. An arrangement according to claim 20, wherein each of said plate means includes spaced edge portions, and wherein said edge portions are provided with a plurality of space cutout portions for imparting a directional change to the wind flow.

22. An arrangement according to claim 19, wherein said passage means in each of said plate means are disposed in a plurality of aligned rows.

23. An arrangement according to claim 22, wherein each of said plate means includes spaced edge portions, and wherein said edge portions are provided with a plurality of spaced cutout portions for imparting a directional change to the wind flow.

24. An arrangement according to claim 18, wherein each of said wind disturbing means includes at least a pair of spaced frame members extending substantially in the plane of said roof surface, and wherein a plurality of bar members extending substantially parallel to a respective side of said roof surface are disposed between said spaced frame members.

25. An arrangement according to claim 18, wherein each of said wind disturbing means includes at least a pair of spaced frame members disposed substantially parallel to a respective side of said roof surface, and wherein a plurality of bar members extending substantially in the plane of the roof surface are disposed between said spaced frame members.

26. An arrangement for reducing wind suction forces on a roof the surface of which has no gradient, the roof surface in a horizontal projection being polygonal in shape with the sides thereof intersecting and forming roof corners, the arrangement comprising: at least a pair of wind disturbing means for disturbing the flow condition of the wind along the surface of the roof and for reducing eddy formations thereon, said wind disturbing means being mounted only in the zone of at least one of the roof corners, each of said wind disturbing means including a substantially semi-circularly wind deflecting surface mounted on said roof, each wind deflector surface being disposed substantially parallel to the respective sides of said roof surface forming said at least one roof corner, said wind disturbing means being mounted on said roof surface with a lateral edge of one of the wind disturbing means abutting a lateral edge of the other of said wind disturbing means, the abutting lateral edges of said wind disturbing means being disposed along a bisector of the angle of said at least one roof corner.

27. An arrangement according to claim 26, wherein each of said wind deflector surfaces is spaced a predetermined vertical distance above said roof surface.

28. An arrangement according to claim 27, wherein each of said wind deflector surfaces are spaced a predetermined distance from a respective side of said roof surface.

29. An arrangement according to claim 28, wherein said wind deflector surfaces along the respective sides of the roof surface are equal in length.

30. An arrangement according to claim 28, wherein one of said wind deflector surfaces has a greater length than the remaining wind deflector surface.

* * * * *